S. A. HARING.
FLAT IRON HEATER.
APPLICATION FILED SEPT. 22, 1909.

974,137.

Patented Nov. 1, 1910.

Inventor
Sarah A. Haring.

By C. A. Snow & Co.
Attorneys

Witnesses
Francis Boyle

UNITED STATES PATENT OFFICE.

SARAH A. HARING, OF CHICAGO, ILLINOIS.

FLAT-IRON HEATER.

974,137.  Specification of Letters Patent.  Patented Nov. 1, 1910.

Application filed September 22, 1909.  Serial No. 518,933.

*To all whom it may concern:*

Be it known that I, SARAH A. HARING, a citizen of the United States, residing at Chicago, in the county of Cook and State of Illinois, have invented a new and useful Flat-Iron Heater, of which the following is a specification.

My invention relates to flat iron heaters and has for its object to provide a device of this character having an outer open bottomed casing that will rest directly upon the burner grid of an oil or gas stove and form a closure for the flat iron supported upon said burner grid.

Another object is to provide a device of this character that will have a baffle disposed above the flat irons contained in the outer casing to direct the heat upon the irons and prevent the absorption of heat by the outer casing.

A further object is to provide a device of this character having ventilating tubes leading from the baffle to the atmosphere whereby to permit of the escape of the heat rising from the burner.

With the above advantages and other objects in view, my invention embraces the novel details of construction and combinations of parts illustrated in the accompanying drawings, described in the following specification and set forth in the appended claims.

Figure 1:
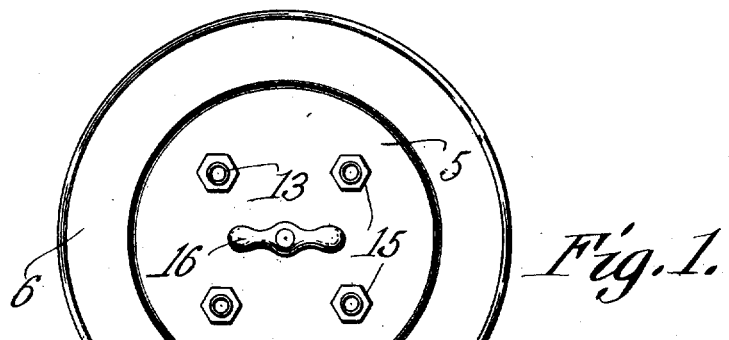
Figure 2:
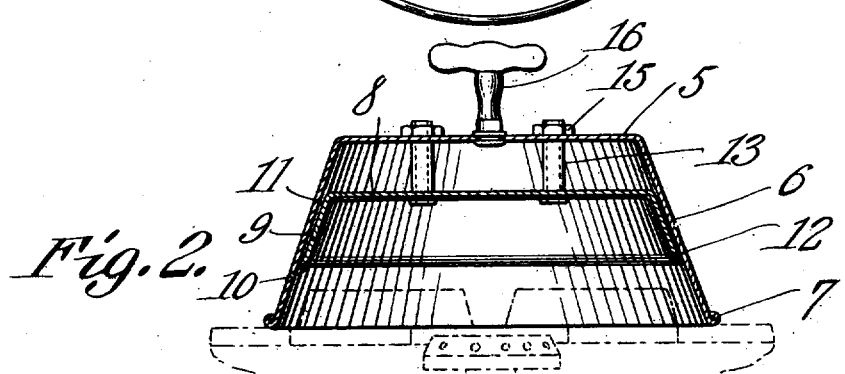
Figure 3:
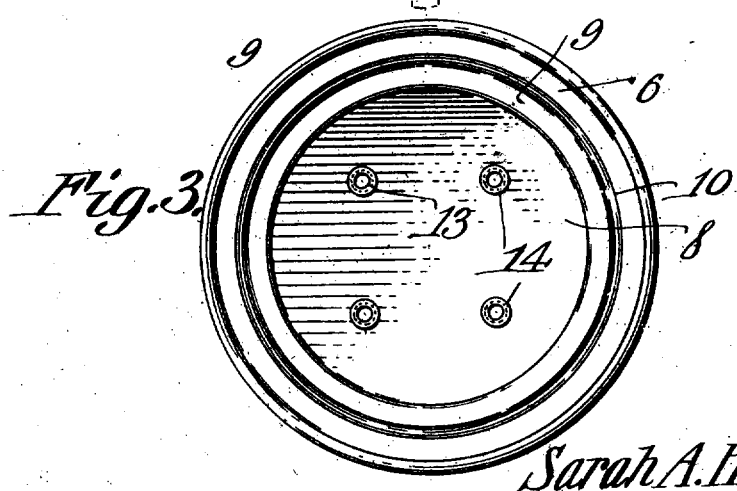

In the accompanying drawings: Figure 1 is a plan view of a flat iron heater constructed in accordance with my invention. Fig. 2 is a longitudinal sectional view of my improved heater, also illustrating a portion of a gas stove, with which I prefer to use the heater. Fig. 3 is an underneath view of the flat iron heater.

Like characters of reference designate similar parts in the views shown.

Referring now to the drawing, the numeral 5 designates the outer casing, which is preferably frusto-conical in outline and is open at the bottom, the lower edges of the lateral walls 6 of the casing being provided with an annular bead 7 for contact with the burner grid. The outer casing forms a closure for the flat irons supported upon the burner grid and permits the heat to strike each portion of the irons direct, thus obviating the waste of heat ordinarily absorbed by the bottom of flat iron heaters as hitherto constructed. Arranged within the outer casing is an inner bottomless casing 8 frusto-conical in outline but having its inclined walls 9 uniformly spaced from the lateral walls of the outer casing, except at their lower extremities, which are turned outwardly to form a peripheral flange 10 for engagement with the inner walls of the outer casing. By this construction an air chamber 11 is formed between the walls of the outer and inner casings, and the heat rising from the burner turned inwardly by the flange 10 and inclined walls 9 onto the flat irons so that the greater portions of the side walls and top of the outer casing will be prevented from absorbing heat. The inner casing thus serves as a baffle to direct the heat upon the irons and prevent needless waste of gas in heating the outer casing.

The inner walls and top of the baffle casing 8 are lined with a non-conductive element 12 which may be secured in position in any desired manner. Asbestos is preferably used for the lining element as it can be made to readily conform to the outline of the casing and is easily secured in position.

For securing the baffle within the outer casing a plurality of tubes 13 are inserted in alined annular openings formed in the top walls of both casings. The terminals of each tube project beyond the tops of the casings, the lower terminal being provided with a peripheral retaining flange 14 which engages the under surface of the top of the baffle casing and the upper terminal being screw threaded for engagement with a retaining nut 15 which bears upon the upper surface of the outer casing. By tightening the nuts 15 on the tubes 13, the baffle casing will be drawn upward in the outer casing until the peripheral rim 10 of the former snugly engages the inner walls of the outer casing so as to form a sufficiently tight joint therebetween to prevent the escape of heat into the air chamber 11 before it has circulated around the flat irons. The tubes 13 afford passage-ways through which the heat rising in the baffle casing may escape into the atmosphere, a circulation of heat currents thereby being formed which will effectively heat the irons in less time and therefore, with a less amount of gas than is possible in the unventilated flat iron heaters as usually constructed. It is thus seen that the tubes perform the double function of hangers and ventilators for the baffle casing and also that the tubes and baffle casing may readily be removed from the outer casing by removing the retaining nuts 15 so that each part of the device is easily accessible for cleaning or repairs.

A suitable cold handle 16 is connected to the top of the outer casing, preferably as shown, for manipulating the heater.

From the foregoing description, taken in connection with the accompanying drawing, it is thought that the construction and operation of my invention will be easily understood, without a more extended explanation, it being understood that various changes in the form, proportion and minor details of construction may be made without sacrificing any of the advantages or departing from the spirit of the invention.

What I claim is:—

1. A heater consisting of a casing adapted to rest upon a burner grid and contain a sad iron, a baffle plate spaced from the top wall of the casing and having a peripheral flange adapted to direct the heat upon the sad iron, and ventilating tubes opening through the opposed walls of the casing and baffle plate to permit of the escape of heat from below the baffle plate.

2. A heater consisting of a casing adapted to rest upon the burner grid and contain a sad iron, a baffle plate within the casing and having a downwardly inclined peripheral flange to direct the heat upon the sad iron, ventilating tubes carried by the baffle plate and opening through the top walls of the casing for permitting the escape of heat from below the baffle plate, and means upon the tubes for adjusting the baffle plate within the casing whereby to maintain the marginal edges of its flange in contact with the walls of the casing and form an insulating air chamber between the casing and baffle plate.

3. A heater consisting of a casing adapted to rest upon a burner grid and contain a sad iron, a baffle plate adjustably mounted within the casing and having a downwardly inclined peripheral flange to direct the heat upon the sad iron, ventilating tubes carried by the baffle plate and projecting through the casing to permit of the escape of heat from below the baffle plate, and adjusting nuts upon the extremities of said tubes for adjusting the baffle plate and maintaining the rim of its flange in contact with the walls of the casing whereby to form an insulated air chamber between the casing and baffle plate.

In testimony that I claim the foregoing as my own, I have hereto affixed my signature in the presence of two witnesses.

SARAH A. HARING.

Witnesses:
 A. N. LAGERSTROM,
 MABEL G. SUTTON.